United States Patent [19]

Hinotani

[11] Patent Number: 4,806,438
[45] Date of Patent: Feb. 21, 1989

[54] TITANIUM-CLAD STEEL AND METHOD FOR THE MANUFACTURE THEREOF

[75] Inventor: Shigeharu Hinotani, Sakai, Japan

[73] Assignee: Sumitomo Metal Industries, Ltd., Osaka, Japan

[21] Appl. No.: 125,158

[22] Filed: Nov. 25, 1987

[30] Foreign Application Priority Data

Nov. 26, 1986 [JP] Japan .................. 61-281232
Dec. 24, 1986 [JP] Japan .................. 61-314729
Feb. 18, 1987 [JP] Japan .................. 62-35372

[51] Int. Cl.$^4$ ............................................. B32B 15/18
[52] U.S. Cl. .................................. 428/660; 428/679; 428/683; 428/685; 228/235
[58] Field of Search ........... 228/237, 243, 235, 263.21, 228/263.19; 428/660, 679, 683, 685

[56] References Cited

U.S. PATENT DOCUMENTS 3,854,891 12/1974 Chivinsky .................. 428/660
4,023,936 5/1977 Morse et al. .............. 228/235

FOREIGN PATENT DOCUMENTS 42-378 1/1967 Japan .................. 428/660
42-379 1/1967 Japan .................. 428/660

Primary Examiner—Deborah Yee
Attorney, Agent, or Firm—Burns, Doane, Swecker & Mathis

[57] ABSTRACT

A titanium-clad steel with improved bonding properties and a method for the manufacture thereof are disclosed. The titanium-clad steel is characterized by comprising a Ti-cladding, a base metal steel, and an insert between them, the insert being made of an alloy consisting essentially of, in % by weight, 0.05% or less of carbon, 3 to 20% by weight of at least one of niobium (Nb) and vanadium (V), and a balance of iron.

14 Claims, 3 Drawing Sheets

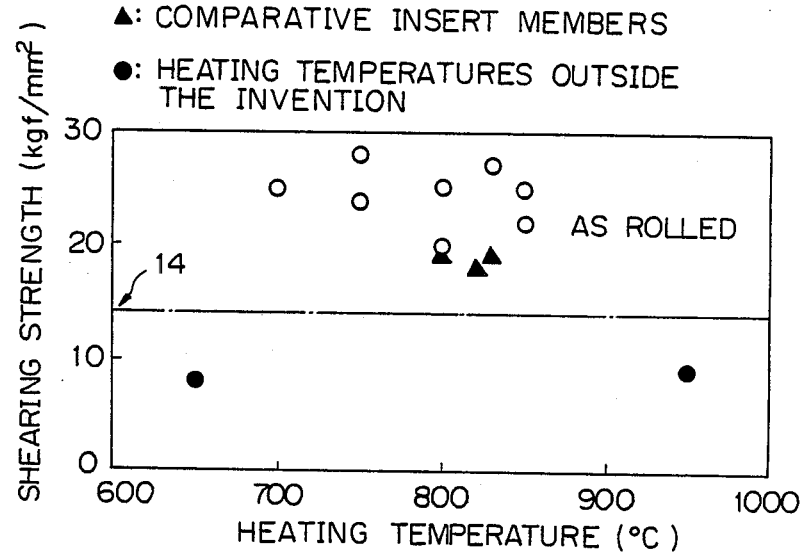
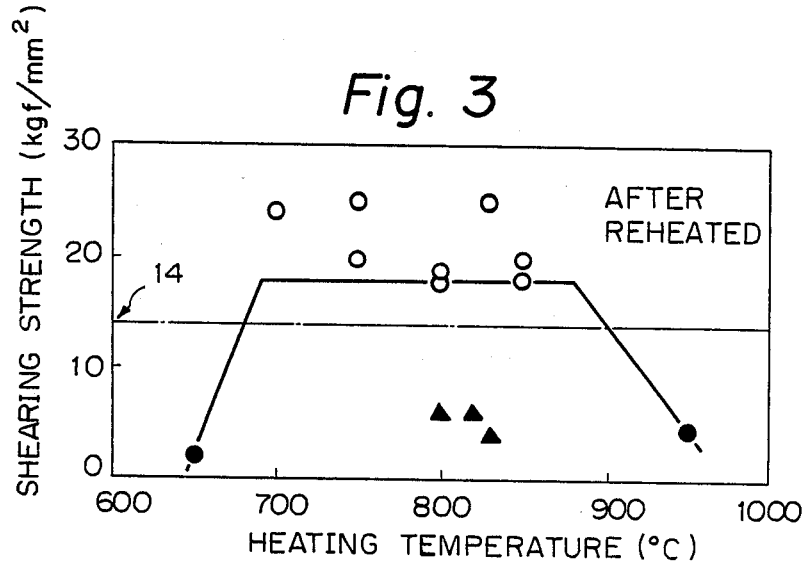

TITANIUM-CLAD STEEL AND METHOD FOR THE MANUFACTURE THEREOF

BACKGROUND OF THE INVENTION

This invention relates to a titanium-clad steel with a high bonding strength and to a method for its manufacture.

Titanium-clad steel has been manufactured by the explosive cladding method, which is advantageous in that the formation of intermetallic compounds is markedly suppressed since the bonding area is not heated to high temperatures, bonding being achieved by heavy working. However, the explosive cladding method has drawbacks regarding noise, productivity, and manufacturing costs.

As a method to eliminate these drawbacks, a rolling method for manufacturing a titanium-clad steel has been developed. In carrying out the rolling method, important factors are (i) an insert to be placed between the steel base metal and Ti cladding, (ii) conditions for assembling with welding as well as for evacuating the assembly, and (iii) heating temperatures for rolling.

Among these factors, it is most important to select an insert particularly suitable for avoiding the formation of brittle intermetallic compounds in the bonding area.

Titanium easily forms intermetallic compounds with various other elements. There are only a few elements such as Mo, Nb, and V that do not form any intermetallic compounds with titanium. However, it is rather difficult to use such materials as an insert, since they are expensive and usually not available in the form of a thin plate. In addition, if they are used as an insert, they are easily broken during rolling.

The purpose of using an insert for manufacturing titanium-cladding steel is to prevent the formation of intermetallic compounds as well as a brittle titanium carbide layer caused by diffusion of carbon from the base metal steel to the Ti cladding in the bonding area between the titanium or titanium alloy and the base metal steel.

In the prior art, in order to prevent the formation of titanium carbides in the bonding area it has been proposed to use a nickel insert (Japanese Patent Application No. 146763/1985), and a pure iron or ultra-low carbon steel insert (Japanese Patent Application Laid-Open Specification No. 122681/1981), and to carry out decarburization of the base metal steel on the titanium-facing side prior to cladding (Japanese Patent Application Laid-Open Specification No. 220292/1984).

The diffusion rate of nickel in titanium is large and the transformation of Ti from alpha-phase to beta-phase due to the diffusion of Ni into Ti during heating and rolling, further accelerates the diffusion of nickel into the Ti cladding. Therefore, the temperature range which can be employed is very restricted. Thus, a nickel insert is less desirable than ferrous inserts. However, the formation of intermetallic compounds is unavoidable even if a ferrous insert is used. Once formed, such intermetallic compounds grow during spinning, welding, strain-releasing annealing, and other processes which follow cladding, resulting in a deterioration in bonding properties.

Thus, in order to achieve stable and improved bonding properties, it is necessary to develop an insert with which there is no formation of intermetallic compounds in the boundary area between the Ti cladding and the insert, or which can delay the formation and growth of such intermetallic compounds.

SUMMARY OF THE INVENTION

The purpose of this invention is to provide a titanium-clad steel which is less expensive and is substantially free from intermetallic compounds in the bonding area between the Ti cladding and the base metal steel and a method for the manufacture thereof.

More specifically, the purpose of this invention is to provide a titanium-clad steel exhibiting a shear strength of 14 kgf/mm$^2$ or more as defined in JIS G 3603 (Ti-clad steels) even after being reheated to high temperatures, and a method for the manufacture thereof.

The inventor of this invention has noted that (i) niobium and vanadium do not form intermetallic compounds with titanium, (ii) Fe-V and Fe-Nb alloys can be worked more easily than Fe-Mo alloys and the former alloys can be rolled to form a thin plate, which is useful as an insert, and (iii) these metals are carbide-formers and effective to prevent the formation of Ti-carbides caused by diffusion of carbon from the base metal.

With the above in mind, the inventor has conducted a series of experiments and found that a ferrous insert containing Nb and V in an amount of 3% or more markedly inhibits the formation of intermetallic compounds of Ti and Fe and that these intermetallic compounds are not formed when the content of Nb and V is increased. This is because V and Nb are stabilizers for the beta-phase of Ti and broaden the beta-phase range due to a diffusive dissolution of these elements into Ti to suppress the formation of intermetallic compounds between Fe and Ti.

Thus, according to this invention a ferrous alloy containing Nb and V is used as an insert.

Therefore, in one aspect, this invention is a titanium-clad steel with improved bonding properties, characterized by comprising a Ti-cladding, a base metal steel, and an insert between them, the insert being made of a ferrous alloy consisting essentially of, in % by weight, 0.05% or less of carbon, 3 to 20% by weight of at least one of niobium (Nb) and vanadium (V), and a balance of iron.

According to this invention, it is possible to provide a titanium-clad steel exhibiting stable and improved bonding properties. However, when it is heated for an extended period of time at a temperature over 600° C. or 650° C. during working or servicing, carbon from the base metal steel and Nb and V of the insert react to form a layer of carbides such as NbC and VC, which deteriorates the bonding properties.

The inventor of this invention has found that the provision of a nickel layer between the insert and the base metal can successfully prevent the diffusion of carbon from the base metal while producing no adverse effects on the insert of the ferrous alloy.

Thus, in another form, this invention is titanium-clad steel with improved bonding properties, characterized by comprising a Ti-cladding, a base metal steel, an insert on the Ti-cladding, and an intermediate layer on the base metal steel, the insert being made of a ferrous alloy consisting essentially of, in % by weight, 0.05% or less of carbon, 3 to 20% by weight of at least one of niobium (Nb) and vanadium (V), and a balance of iron, the intermediate layer being made of nickel (Ni) or a nickel alloy.

The inventor of this invention has also found that austenitic alloys with a fcc crystal structure such as austenitic stainless steels are very effective to successfully prevent diffusion of carbon from the base metal steel, and that the diffusion of carbon is determined by the crystal structure of the matrix phase, and the diffusion rate of carbon in the closed-packed structure is small, i.e., 0.1 mm for 100 hours at 600° C.

Thus, in a preferred embodiment, this invention is a titanium-clad steel with improved bonding properties, characterized by comprising a Ti-cladding, a base metal steel, an insert on the Ti-cladding, and an intermediate layer on the base metal steel, the insert being made of a ferrous alloy consisting essentially of, in % by weight, 0.1% or less of carbon, 1 to 20% by weight of at least one of niobium (Nb) and vanadium (V), and a balance of iron, the intermediate layer being made of Fe-Ni-Cr austenitic alloy containing the amounts of Ni and Cr as defined by the following formulas, in % by weight;

$$Cr \leq 18\%, Ni \geq -0.78\ Cr\ \% + 26$$

$$Cr > 18\%, Ni \geq 1.13\ (Cr\ \% - 18) + 12$$

wherein, Cr % + Ni % ≦ 100

In a still another aspect, this invention is a method of manufacturing a Ti-clad steel with improved bonding properties, which comprises a Ti cladding and a base metal steel, the method comprising preparing a cladding assembly of the Ti-cladding, the base steel, and an insert placed between them, the insert being made of a ferrous alloy containing, in % by weight, 3 to 20% of at least one of Nb and V, and a balance of iron, heating the cladding assembly or the bonding area at a temperature of 680° to 900° C., and preferably 700° to 870° C., and effecting bonding under pressure.

In a preferred embodiment, an intermediate plate of nickel or nickel alloy may be placed between the insert and the base metal steel.

The intermediate plate may also be replaced by the before-defined Fe-Ni-Cr austenitic alloy.

The preparation of the cladding assembly comprises sealing the assembly of the Ti-cladding, the insert, the intermediate layer, if used, and the base metal steel, degassing, and evacuating the assembly.

The Ti cladding may include pure titanium and titanium alloys. The base metal steel is not restricted to a specific one, but preferably it is selected from carbon steels and low-alloy high-strength steels.

The insert may be a powder layer, powder coating layer, or electroplated layer placed on the base metal.

The austenitic alloy may contain 0.1% by weight or less of carbon, and it may contain Mn, Si, Mo, Ti, Nb, and other alloying elements in a total amount of 5% by weight or less.

BRIEF DESCRIPTION OF THE DRAWINGS

FIG. 2 and FIG. 3 are graphs showing the test results of the working examples of this invention;

DESCRIPTION OF THE PREFERRED EMBODIMENTS

This invention will now be described in conjunction with the attached drawings.

Figure 1:
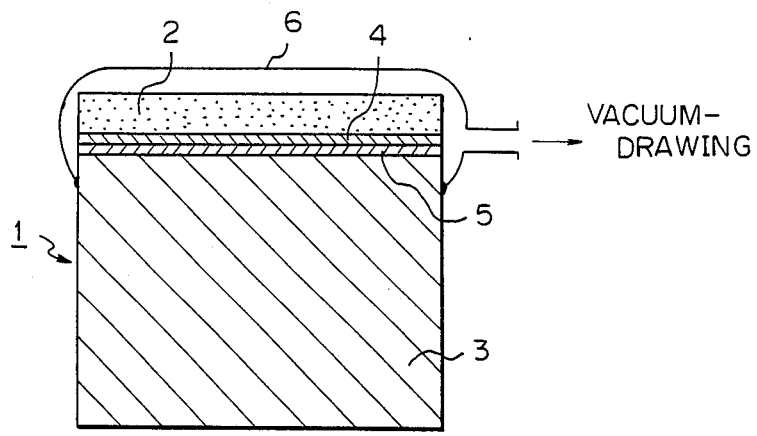
FIG. 1 is a diagramatic sectional view of a cladding assembly of this invention.

FIG. 1 shows a diagramatic sectional view of a cladding assembly 1 prior to bonding. The assembly 1 comprises Ti cladding 2 and a base metal steel 3, an insert 4 of a ferrous alloy placed between them, and if necessary, an intermediate member 5 of a nickel or an austenitic alloy. The thickness of the insert is preferably 0.5 mm or more, and usually 1 mm or more. The thickness of the intermediate member is generally greater than 50 μm, and preferably greater than 100 μm, but is thinner than the insert. A cover 6 is disposed over the whole of the assembly, and is seal-welded to the base metal steel. The inside thereof is degassed and evacuated, preferably to $10^{-1}$ Torr or less. The evacuation is carried out in order to suppress oxidation of each of the bonding surfaces. When a predetermined level of vacuum is achieved, the whole of the assembly or at least the bonding area thereof is heated to 680° to 900° C., and preferably 700° to 870° C., and is hot rolled to effect cladding. After the rolling, the cover 6 is removed to obtain a Ti-clad steel.

Each of the steps mentioned above is known in the art as a rolling method to achieve cladding except for the above-specified heating conditions.

The reasons for the restrictions on the composition of the insert employed in this invention will be described in more detail.

First, the carbon content is defined as 0.05% or less in order to have V and Nb as active as possible. For this purpose, the lower the carbon content the better. When the carbon content is over 0.05%, Nb and V easily react with carbon to form carbides thereof, causing cracks during cold rolling which is employed to prepare an insert in the form of a thin plate. The upper limit on the carbon content is therefore set at 0.05%, since a satisfactory level of the shear strength can be obtained even when the content of carbon is restricted to 0.05% or less. In case the Fe-Ni-Cr alloy is used as the intermediate member between the insert and the base metal, the upper limit of carbon may be 0.1%.

Regarding the content of Nb and V, the total amount thereof is restricted to 3.0% or more. In case the Fe-Ni-Cr alloy is employed in place of the nickel plate as the intermediate member, the lower limit of a total amount of Nb and V may be 1.0%. It is not always necessary to specify an upper limit thereon, ut in view of the material costs, the upper limit thereof is restricted to 20%. Preferably, the total amount of Nb and/or V is 5-15%.

Such a ferrous alloy insert may be placed on the base metal steel in the form of a thin plate or a foil. The insert may be formed by means of powder coating.

In a preferred embodiment of this invention, an additional insert, i.e., the intermediate member may be employed in order to further improve the bonding properties. The intermediate member may be a nickel plate or nickel alloy plate. The nickel plate may be of industrial-grade pure nickel. The purity and the content of impurities do not have any substantial effects. The nickel alloy may include commercial nickel alloys such as Permalloy (50% Ni - 50% Fe)—tradename—and invar alloys (36% Ni - 64% Fe).

The nickel intermediate member may be in the form of a foil. This layer may also be formed by means of electroplating or powder coating.

Since one of the purposes of providing the intermediate member is to prevent the carbon of the base metal from diffusing and permeating into the ferrous alloy insert when reheating after rolling, the thickness of the intermediate member is expressed in terms of thickness after rolling. If it is expressed in this way, a thickness of 5 μm or more is enough.

On the other hand, regarding the intermediate member of Fe-Ni-Cr alloys which may be used in place of the nickel intermediate member between the insert and the base metal steel, the crystal structure is to have an austenitic phase (fcc phase) in order to prevent diffusion of carbon from the base metal steel. As long as it has an austenitic phase, there is no limit regarding the intermediate member.

Fe-Ni-Cr alloys which comprise an austenitic phase (fcc phase) are austenitic alloys containing the amounts of Ni and Cr defined by the following formulas, in % by weight;

$Cr \leq 18\%$, $Ni \geq -0.78Cr \% + 26$ $Cr > 18\%$, $Ni \geq 1.13(Cr \% - 18) + 12$ wherein, $Cr \% + Ni \% \leq 100$.

The austenitic alloy intermediate member may be in the form of a foil. This layer may also be formed by means of electroplating or powder coating.

Figure 6:
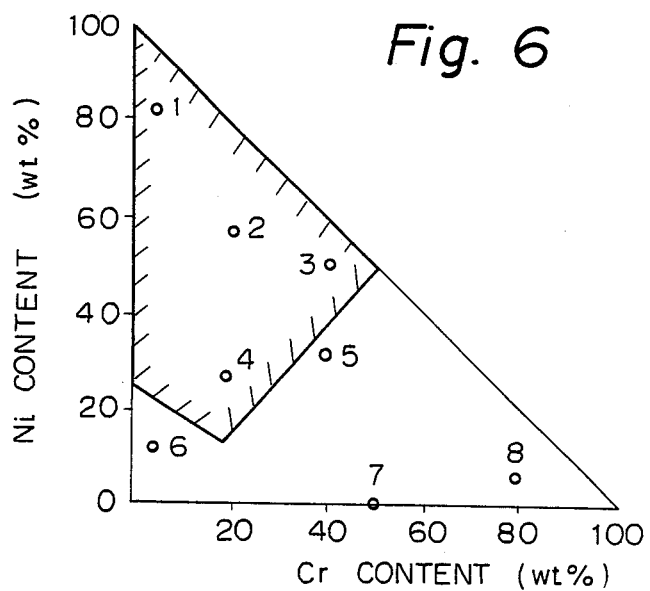
FIG. 6 is a graph showing the Ni and Cr content of alloys used as an intermediate member.

FIG. 6 is a graph showing the Ni and Cr content of alloys used as an intermediate. The hatched area in the graph indicates an austenitic alloy, and the other area indicates ferrite or ferrite+austenite dual-phase alloys. The reference numerals in the graph refer to the alloy numbers of Table 3 to be detailed hereinafter.

The presence of Fe does not have any substantial effects on the formation of an austenitic phase, and the Fe content does not have any upper limit. However, the Ni content should be as low as possible because Ni is expensive. The remainder is iron with incidental impurities. Therefore, it is desirable that the Fe content be as high as possible. When the austenitic alloy contains more than 0.1% of carbon, the diffusion of carbon sometimes occurs so much that Ti carbides form, producing a decrease in bonding strength. Thus, it is desirable that the carbon content be restricted to 0.1% or less. In addition, when the total amount of other alloying elements such as Si, Mn, Mo, Ti, and Nb is more than 5% by weight, the austenitic phase becomes unstable. Thus, the total content of these elements, if present, is restricted to 5% by weight or less.

There is no specific restriction on the thickness of the intermediate member. The thickness is determined in view of reheating temperatures and reheating time after rolling. In most cases, a thickness of 5 μm or more after cladding by rolling is enough. The upper limit may be determined based on the circumstances.

A cladding assembly is heated to a predetermined temperature and then is subjected to bonding under pressure. In the case of this invention, the bonding area or the whole of the cladding assembly is heated to 680° to 900° C., preferably 700° to 870° C., and then is subjected to bonding under pressure. When the assembly is not heated to 680° C. or higher, and preferably 700° C. or higher, the interdiffusion is not thorough, and a more powerful rolling apparatus is necessary to carry out rolling. In contrast, when the assembly is heated to a temperature higher than 900° C., transformation of the Ti cladding into beta-phase takes place or the formation of beta-phase is accelerated. As a result, the diffusion rate of Ti becomes too great, accelerating the formation of intermetallic compounds, so that the bonding strength does not satisfy specifications. Therefore, in this invention, the upper limit on the heating temperature is defined as 900° C. and preferably 870° C.

A typical means of carring out bonding under pressure is rolling. It may also be performed by forging and the like, which are suitable methods for carrying out bonding of small-sized articles.

This invention will be further detailed with reference to working examples, which are presented merely for illustrative purposes.

EXAMPLE 1

A plate of low-alloy high-strength steel of 50 kgf/mm² grade, 90 mm thick, was machined to give a flat surface and degreased. This plate was the base metal. A Ti-plate (JIS first grade), 10 mm thick, was used as the Ti cladding. These members were assembled by means of welding to give the cladding assembly shown in FIG. 1. In this example, the intermediate member 5 was deleted. As the insert 4, a lot of materials shown in Table 1 were employed in the form of a sheet 1 mm thick. The inside of the cladding assembly was evacuated to a pressure of $3 \times 10^{-1}$ Torr, and then was closed. After heating, bonding under pressure was carried out to provide a 20-mm thick Ti-clad steel.

The thus-manufactured Ti-clad steels were then subjected to the shearing tensile test defined in JIS G 0601 to evaluate the bonding properties.

When the heating temperature was within the range of 700°–800° C., the shear strength was over 14 kgf/mm² for each of the specimens. In order to evaluate a change in the shear strength after reheating, the shear strength after reheating at 850° C. for 10 hours was determined. For the steel of this invention, the shear strength was 14 kgf/mm² or more, showing improvement in bonding properties. The test results are summarized in Table 1 and the relationships between the shear strength of the as-rolled specimens and that of the specimens after being reheated are shown in FIGS. 2 and 3, respectively.

The relationships between the content of Nb and V of the ferrous alloy insert and the growth of intermetallic compounds were evaluated.

Figure 4:
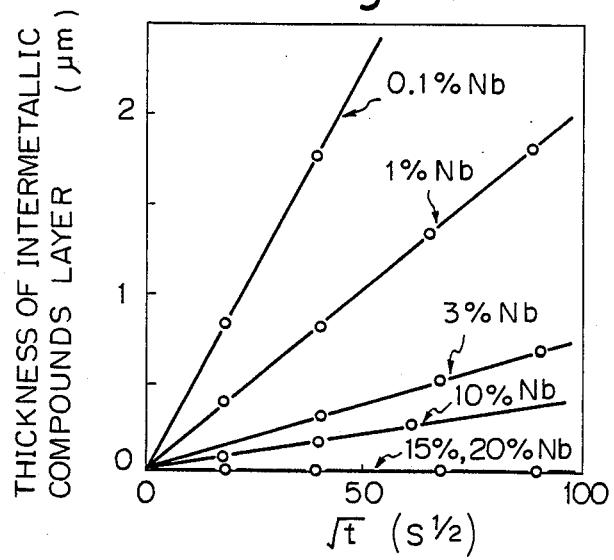
FIG. 4 and FIG. 5 are graphs showing relationships between the growth of intermetallic compounds and heating time for Nb- and V-bearing inserts, respectively.
Figure 5:
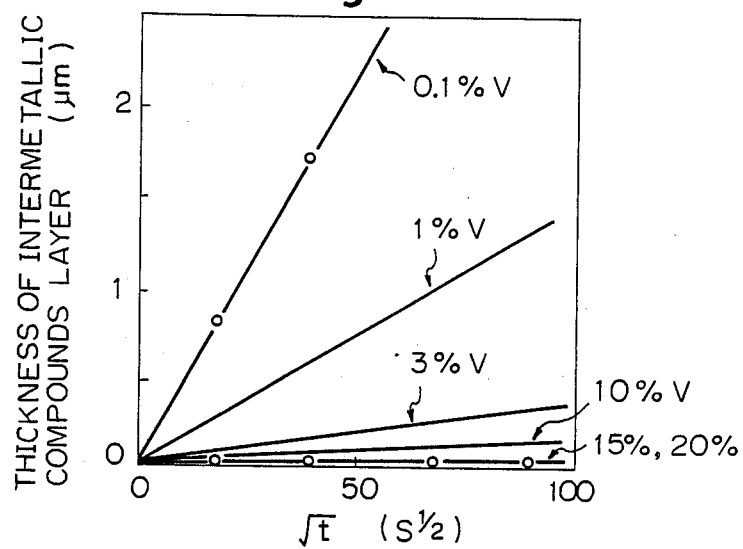

FIGS. 4 and 5 show graphs of the thickness (μm) of intermetallic compounds with iron in the boundary of the base metal steel, which are plotted with respect to the heating time (second) at 850° C. when the contents of Nb and V are varied.

In these cases, when the content of Nb and V is 3% or more, there is no longer a significant degree of formation of intermetallic compounds. When the content goes over 20%, the effect thereof saturates.

EXAMPLE 2

In this example, Example 1 was repeated except that the intermediate member 5 of industrial-grade pure nickel was used in the form of a foil 100 μm thick.

In this example, too, when the heating temperature was within the range of 700°–800° C., the shear strength was over 14 kgf/mm² for each of the specimens. In order to evaluate a change in the shear strength after reheating, the shear strength after reheating at 850° C. for 10 hours, 30 hours, and 100 hours was determined. For steels of this invention, the shear strength was 14 kgf/mm² or more even after being reheated at 850° C.

for 100 hours, showing a remarkable improvement in bonding properties. The test results are summarized in Table 2.

EXAMPLE 3

In this example, Example 2 was repeated except that a Fe-Ni-Cr alloy in a foil 100 μm thick was used in place of the Ni member as the intermediate member.

In order to evaluate the bonding properties after reheating, the test pieces were heated to 850° C. for 100 hours, and the change in shearing strength was determined.

The alloying compositions of austenitic alloys of the intermediates employed in this example are shown in Table 3.

The test results are summarized in Table 4.

As is apparent from the test results shown in Table 4, according to this invention, the shear strength of the as-rolled steel was 20 kgf/mm$^2$ or more for each of the test samples. In addition, after heating at 850° C. for 100 hours, the shear strength defined in JIS specifications is 14 kgf/mm$^2$ or higher, e.g., 20 kgf/mm$^2$ or higher.

Thus, according to this invention bonding properties have been improved remarkably.

As is apparent from the foregoing, this invention can provide a Ti-clad steel in which intermetallic compounds are not found in the bonding area, and which exhibits improved properties including a high level of bonding strength even after reheating at high temperatures. Thus, this invention is very advantageous from a practical viewpoint.

TABLE 1

| Run No. | Ferrous Alloy Insert (% by weight) | | | Heating Temperature (°C.) | Shear Strength (kgf/mm$^2$) | | Remarks |
|---|---|---|---|---|---|---|---|
| | C | Nb | V | | As-Rolled | Reheated | |
| 1 | 0.02 | 3.1 | — | 800 | 20 | 18 | Invention |
| 2 | 0.02 | 3.1 | — | 650 | 8 | 2 | Comparative |
| 3 | 0.04 | 10 | — | 850 | 25 | 20 | Invention |
| 4 | 0.03 | 20 | — | 830 | 27 | 25 | Invention |
| 5 | 0.03 | 20 | — | 950 | 9 | 3 | Comparative |
| 6 | 0.02 | 0.5 | — | 820 | 18 | 6 | Comparative |
| 7 | 0.03 | — | 0.3 | 830 | 19 | 4 | Comparative |
| 8 | 0.03 | — | 3.2 | 850 | 22 | 18 | Invention |
| 9 | 0.01 | — | 5 | 800 | 25 | 19 | Invention |
| 10 | 0.03 | — | 11 | 750 | 28 | 25 | Invention |
| 11 | 0.01 | — | 19 | 700 | 25 | 24 | Invention |
| 12 | 0.03 | 5 | 10 | 750 | 24 | 20 | Invention |
| 13 | 0.02 | 0.2 | 0.1 | 800 | 19 | 6 | Comparative |

TABLE 2

| Run No. | Ferrous Alloy Insert (% by weight) | | | Intermediate Member | Heating Temperature (°C.) | Shear Strength (kgf/mm$^2$) | | | | Remarks |
|---|---|---|---|---|---|---|---|---|---|---|
| | C | Nb | V | | | As-Rolled | Time Elapsed After Heating at 850° C. (hr) | | | |
| | | | | | | | 10 | 30 | 100 | |
| 1 | 0.02 | 3.5 | — | Present | 800 | 22 | 20 | 20 | 18 | Invention |
| 2 | 0.02 | 3.5 | — | None* | 800 | 22 | 20 | 14 | 10 | Comparative |
| 3 | 0.02 | 3.5 | — | Present | 650* | 10 | 2 | 3 | 1 | Comparative |
| 4 | 0.04 | 10 | — | Present | 850 | 25 | 25 | 20 | 18 | Invention |
| 5 | 0.04 | 10 | — | None* | 850 | 25 | 23 | 18 | 13 | Comparative |
| 6 | 0.03 | 20 | — | Present | 830 | 27 | 27 | 25 | 20 | Invention |
| 7 | 0.03 | 20 | — | None* | 830 | 27 | 25 | 20 | 13 | Comparative |
| 8 | 0.03 | 20 | — | Present | 950* | 13 | 10 | 8 | 5 | Comparative |
| 9 | 0.02 | 0.5* | — | Present | 820 | 20 | 18 | 12 | 5 | Comparative |
| 10 | 0.03 | — | 0.3* | Present | 800 | 18 | 15 | 5 | 2 | Comparative |
| 11 | 0.03 | — | 4.5 | Present | 750 | 28 | 25 | 20 | 16 | Invention |
| 12 | 0.03 | — | 4.5 | None* | 750 | 28 | 20 | 14 | 7 | Comparative |
| 13 | 0.03 | — | 4.5 | Present | 600* | 8 | 5 | 2 | 2 | Comparative |
| 14 | 0.03 | — | 11 | Present | 800 | 28 | 25 | 25 | 20 | Invention |
| 15 | 0.03 | — | 11 | None* | 800 | 28 | 20 | 14 | 10 | Comparative |
| 16 | 0.03 | — | 19 | Present | 700 | 30 | 28 | 25 | 25 | Invention |
| 17 | 0.01 | 5 | 10 | Present | 700 | 27 | 27 | 26 | 20 | Invention |
| 18 | 0.02 | 5 | 10 | None* | 750 | 28 | 21 | 17 | 10 | Comparative |
| 19 | 0.02 | 0.3 | 0.5 | Present | 820 | 20 | 18 | 13 | 8 | Comparative |

None:
*indicates outside the range of the invention.

TABLE 3

| Alloy No. | C | Cr | Ni | Others |
|---|---|---|---|---|
| 1 | 0.08 | 5.0 | 80.0 | |
| 2 | 0.04 | 19.9 | 55.3 | Mn = 1.5 |
| 3 | 0.10 | 40.2 | 50.2 | Si = 2.5 |
| 4 | 0.02 | 20.3 | 25.7 | Mo = 1.0 |
| 5* | 0.02 | 39.8 | 30.4 | |
| 6* | 0.10 | 4.8 | 10.5 | |
| 7* | 0.08 | 50.3 | 0.24 | |
| 8* | 0.05 | 35.2 | 20.2 | |

Note:
*indicates outside the range of the invention.

TABLE 4

| Run No. | Ferrous Alloy Insert (% by weight) | | | Fe—Ni—Cr Alloy (Alloy No. of Table 3) | Shear Strength (kgf/mm$^2$) | | Remarks |
|---|---|---|---|---|---|---|---|
| | C | Nb | V | | As-Rolled | 100 hours After Heating at 850° C. | |
| 1 | 0.09 | 3.5 | — | 1 | 25 | 20 | Invention |
| 2 | 0.03 | 5.2 | — | 6* | 28 | 11 | Comparative |
| 3 | 0.10 | 10.3 | — | 2 | 30 | 23 | Invention |
| 4 | 0.09 | 12.5 | — | 8* | 31 | 10 | Comparative |

TABLE 4-continued

| Run No. | Ferrous Alloy Insert (% by weight) | | | Fe—Ni—Cr Alloy (Alloy No. of Table 3) | Shear Strength (kgf/mm²) | | Remarks |
|---|---|---|---|---|---|---|---|
| | C | Nb | V | | As-Rolled | 100 hours After Heating at 850° C. | |
| 5 | 0.05 | 20.0 | — | 3 | 35 | 25 | Invention |
| 6 | 0.03 | 19.5 | — | 7* | 33 | 12 | Comparative |
| 7 | 0.10 | — | 4.5 | 4 | 26 | 18 | Invention |
| 8 | 0.02 | — | 4.6 | 5* | 26 | 7 | Comparative |
| 9 | 0.03 | — | 11.2 | 1 | 30 | 20 | Invention |
| 10 | 0.08 | — | 13.0 | 6* | 31 | 10 | Comparative |
| 11 | 0.03 | — | 19.0 | 2 | 34 | 24 | Invention |
| 12 | 0.09 | — | 19.5 | 8* | 35 | 11 | Comparative |
| 13 | 0.02 | 2.0 | 1.5 | 3 | 24 | 18 | Invention |
| 14 | 0.01 | 2.0 | 2.0 | 7* | 25 | 6 | Comparative |
| 15 | 0.07 | 10.0 | 2.0 | 4 | 31 | 23 | Invention |
| 16 | 0.03 | 11.0 | 2.5 | 5* | 32 | 12 | Comparative |

Note:
*indicates outside the range of the invention.

I claim:

1. A titanium-clad steel with improved bonding properties, comprising a Ti-cladding, a base metal steel, an insert between them, and an intermediate layer between said base metal steel and said insert, said insert being an alloy consisting essentially of, in % by weight, 0.05% or less of carbon, 3 to 20% by weight of at least one of niobium (Mb) and vanadium (V), and a balance or iron, said intermediate layer being of nickel or a nickel alloy.

2. A titanium-clad steel as defined in claim 1, in which the Ti-cladding is selected from pure titanium and titanium alloys.

3. A titanium-clad steel as defined in claim 1, in which the base metal is selected form carbon steels and low-alloy high-strength steels.

4. A titanium-clad steel as defined in claim 1, in which the insert is in the form of a thin plate.

5. A titanium-clad steel with improved bonding properties, characterized by comprising a Ti-cladding, a base metal steel, an insert on the Ti-cladding, and an intermediate layer on the base metal steel, said insert being made of an alloy consisting essentially of, in % by weight, 0.1% or less of carbon, 1 to 20% by weight of at least one of niobium (Nb) and vanadium (V), and a balance of iron, said intermediate layer being made of an Fe-Ni-Cr austenitic alloy containing the amounts of Ni and Cr as defined by the following formulas, in % by weight;

Cr≦18%, Ni≧ −0.78Cr %+26

Cr>18%, Ni≧1.13(Cr %−18)+12 wherein, Cr %+Ni %≦100.

6. A titanium-clad steel as defined in claim 5, in which the ferrous alloy contains 0.05% by weight or less of carbon, and a total of 3–20% by weight of at leat one of Nb and V.

7. A titanium-clad steel as defined in claim 5, in which the austenitic alloy contains 0.1% by weight or less of carbon.

8. A titanium-clad steel as defined in claim 5, in which the Ti-cladding is selected from pure titanium and titanium alloys.

9. A titanium-clad steel as defined in claim 5, in which the base metal is selected from carbon steel and low-alloy high-strength steels.

10. A titanium-clad steel as defined in claim 5, in which the insert is in the form of a thin plate.

11. A method of manufacturing a Ti-clad steel with improved bonding properties, which comprises Ti cladding and base metal steel, the method comprising preparing a cladding assembly of the Ti-cladding, the base metal steel, and insert placed between them, and an intermediate layer between the base metal steel and the insert, the insert being a ferrous alloy containing, in % by weight, a total of 3 to 20% of at least one of Nb and V, and a balance of iron, the intermediate layer being nickel or a nickel alloy, heating the cladding assembly or the bonding area at a temperature of 680° to 900° C., and effecting bonding under pressure.

12. A method as defined in claim 10, in which the bonding is carried out by rolling.

13. A method as defined in claim 10, in which the heating is carried at 700°–870° C.

14. A method as defined in claim 10, in which an austenitic alloy intermediate member is employed in place of the nickel intermediate member, and said insert is made of an alloy consisting essentially of, in % by weight, 0.1% or less of carbon, 1 to 20% by weight of at least one of niobium (Nb) and vanadium (V), and a balance of iron, and said austenitic alloy intermediate member is made of an Fe-Ni-Cr austenitic alloy containing the amounts of Ni and Cr as defined by the following formulas, in % by weight;

Cr≦18%, Ni≧ −0.78Cr %+26

Cr>18%, Ni≧1.13(Cr %−18)+12 wherein, Cr %+Ni %≦100.

* * * * *